United States Patent [19]
Schindler

[11] Patent Number: 6,081,830
[45] Date of Patent: Jun. 27, 2000

[54] AUTOMATIC LINKING TO PROGRAM-SPECIFIC COMPUTER CHAT ROOMS

[75] Inventor: Jeffrey Schindler, Sioux City, Iowa

[73] Assignee: Gateway 2000, Inc., North Sioux City, S. Dak.

[21] Appl. No.: 08/947,613

[22] Filed: Oct. 9, 1997

[51] Int. Cl.[7] .............................. G06F 13/38; G06F 15/17
[52] U.S. Cl. .................... 709/204; 709/223; 709/229; 709/233; 340/825.03; 345/327; 348/7; 348/552; 348/564; 455/3.1; 455/5.1; 455/6.1; 455/6.3
[58] Field of Search ........................ 345/327; 709/223, 709/204, 224, 229, 233; 340/825.03; 455/3.1, 5.1, 6.1, 6.3; 348/7, 8, 10, 11, 15, 552, 564

[56] References Cited

U.S. PATENT DOCUMENTS

| | | | |
|---|---|---|---|
| 4,333,152 | 6/1982 | Best | 345/327 |
| 5,694,163 | 12/1997 | Harrison | 348/13 |
| 5,721,763 | 2/1998 | Joseph et al. | 379/88.04 |
| 5,774,666 | 6/1998 | Portuesi | 709/218 |
| 5,774,668 | 6/1998 | Choquier et al. | 709/223 |
| 5,793,973 | 8/1998 | Birdwell et al. | 709/223 |
| 5,812,931 | 9/1998 | Yuen | 455/5.1 |
| 5,818,935 | 10/1998 | Maa | 380/20 |
| 5,828,839 | 10/1998 | Moncreiff | 709/204 |
| 5,833,468 | 11/1998 | Gut et al. | 434/350 |
| 5,864,823 | 6/1999 | Levitan | 705/14 |
| 5,880,731 | 3/1999 | Liles et al. | 345/349 |
| 5,887,133 | 3/1999 | Brown et al. | 709/200 |
| 5,889,764 | 3/1999 | Needham et al. | 370/263 |
| 5,896,444 | 4/1999 | Perlman et al. | 379/93.35 |
| 5,905,865 | 5/1999 | Palmer et al. | 455/3.1 |
| 5,907,322 | 5/1999 | Kelly et al. | 345/327 |
| 5,920,304 | 6/1999 | Berstis | 345/145 |
| 5,923,379 | 6/1999 | Patterson | 348/565 |
| 5,929,849 | 7/1999 | Kikinis | 345/327 |

FOREIGN PATENT DOCUMENTS

| | | | |
|---|---|---|---|
| 0852361 | of 0000 | European Pat. Off. . | |
| 0 834 798 A2 | 8/1998 | European Pat. Off. | G06F 3/033 |
| 97/13368 | 4/1997 | WIPO . | |
| 97/33434 | 9/1997 | WIPO . | |

*Primary Examiner*—Frank J. Asta
*Assistant Examiner*—Bunjob Jaroenchonwanit
*Attorney, Agent, or Firm*—Schwegman, Lundberg, Woessner & Kluth, P.A.; Anthony Claiborne

[57] ABSTRACT

The automatic linking to program-specific computer chat rooms is disclosed. A computer detects the channel selected on a corresponding tuner. By referencing the channel and the time and date in which the computer is operating against an electronic program guide, the computer is able to determine the specific program currently on the channel. A unique identification code for the program is sent to a central server. The server links the computer to a computer chat room specific to the program for the unique identification code. This enables computer users viewing the same program to automatically enter the same chat room and chat to one another.

17 Claims, 3 Drawing Sheets

AUTOMATIC LINKING TO PROGRAM-SPECIFIC COMPUTER CHAT ROOMS

FIELD OF THE INVENTION

This invention relates generally to computer chat rooms, and more particularly to automatic linking to such chat rooms that are program specific.

BACKGROUND OF THE INVENTION

With the advent of online service providers such as America Online, Prodigy, and CompuServe, as well as with the advent of the Internet, computer chat rooms have become increasingly popular. Computer chat rooms permit any of a number of computer users scattered across the country or around the world to virtually talk with one another within a virtual chat room. That is, text or other data entered on a computer by one user is displayed on the computers of all the other users within the same virtual chat room.

Chat rooms have become a popular manner for computer users to communicate with other users having similar interests. For example, a football fan may enter a computer chat room geared towards football to discuss football with other fans. Online service providers such as America Online also routinely host chat rooms geared towards a specific event. For example, while a Super Bowl or other such major event is being televised, the service provider may host a chat room for fans to talk about the currently televised event.

However, such chat rooms fall short of an optimal user experience. A computer user watching television, for example, has to change television channels to a desired program, but then also has to log on to an online service or the Internet and find a computer chat room specific to the program being watched. If the user changes channels, the process starts over: the user has to again find a computer chat room specific to the program being watched. Because of the inconvenience in having to constantly manually change chat rooms, the user may believe that such inconvenience outweighs the benefits provided by participating in such chat rooms, and not participate.

In one limited solution to providing an Internet URL address automatically in conjunction with the broadcasting of a television program, the Internet URL address of a related web site may be broadcast in the vertical blanking interrupt (VBI). A browser program may automatically go to the address being broadcast, or it may present an option to the user to press a button in order to go to the address. Thus, the VBI approach means that the user does not have to constantly manually change chat rooms. However, the VBI approach is itself quite limited, in that it is susceptible to timing problems. That is, if a television program is recorded to a video cassette recorder (VCR), when it is later played back, the browser program may still attempt to go to the address being broadcast, even though it may no longer be applicable. Thus, the user may be confronted with an error message, stating that the broadcast web is no longer be accessible.

SUMMARY OF THE INVENTION

The above-identified as well as other shortcomings are addressed by the present invention, which will be understood by reading and studying the following specification. The invention describes automatic linking to program-specific computer chat rooms. In one embodiment, a computer detects the channel switched to on a corresponding tuner, and sends an identification code for a program currently on the channel to a server. The server then links the computer to a chat room for the program corresponding to the identification code.

In this manner, the invention provides for more convenient program-specific chat rooms. The user's computer is able to detect when the user switches from one channel to another on the tuner (e.g., the tuner of a television, a set-top box, etc.; the invention is not so limited). The computer identifies the program currently on the new channel, and sends a corresponding identification code to the server (e.g., the server for an online service provider). The server then switches the user to a new chat room, which is specific to the current program on the new channel. This enables the user to virtually chat with other users watching the same program. The invention desirably is implemented on a computer such as a Destination Big Screen PC/TV, available from Gateway 2000, Inc., of North Sioux City, S.Dak., which includes Harman Interactive SmartTV software, although the invention is not so limited.

In different embodiments of the invention, computerized chat systems, computers, and computer-readable media of varying scope are described. Still other and further embodiments, aspects and advantages of the invention will become apparent by reference to the drawings and by reading the following detailed description.

DETAILED DESCRIPTION OF THE INVENTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims.

Figure 1:
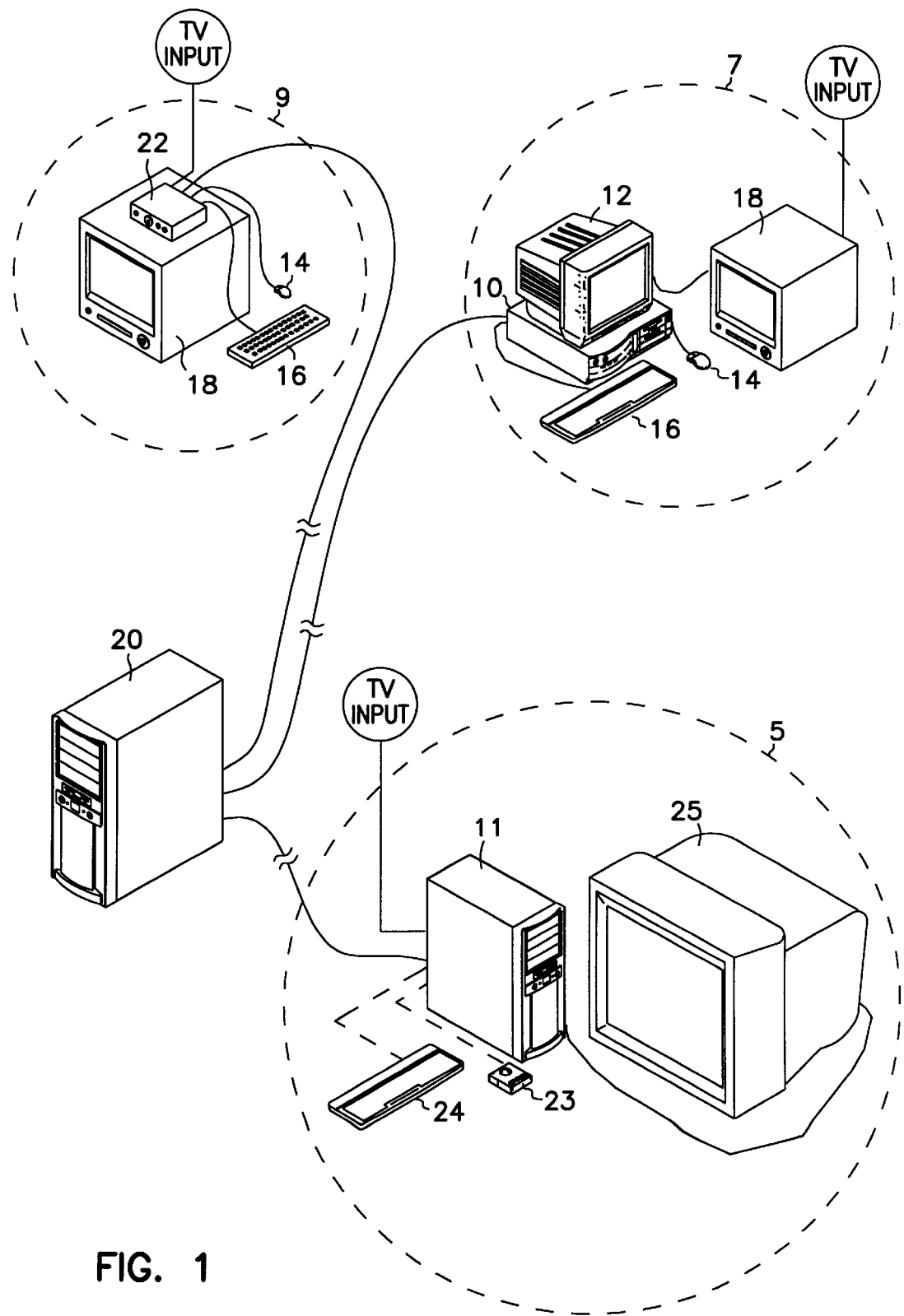
FIG. 1 is a diagram of a computerized chat system according to an embodiment of the invention.

Referring first to FIG. 1, a diagram of a computerized chat system according to an embodiment of the invention is shown. A number of computer systems 5, 7 and 9 are shown operatively coupled to server 20. Each computer system represents a different configuration that is amenable to the invention. Those of ordinary skill within the art will recognize that the invention is not particularly limited to a given computer system.

With respect to computer system 7, computer 10 is coupled to a monitor 12, a pointing device 14, and a keyboard 16. Computer 10 includes a processor (preferably, an Intel Pentium processor), random-access memory (preferably, at least sixteen megabytes), read-only memory (ROM), and one or more storage devices, such as a hard disk drive, a floppy disk drive, an optical disk drive, and a tape cartridge drive. The invention is not particularly limited to a given type of computer 10. A given computer 10 is preferably a PC-compatible computer such as those manufactured and available from Gateway 2000, Inc., of North Sioux City, S.Dak., and running a version of the Microsoft Windows operating system. The construction and operation of such computers are known within the art. Computer 10 may be either a portable or a desktop computer, as well.

Monitor 12 of computer system 7 permits the display of information for viewing by a user of the computer. The invention is not limited to any particular type of monitor 12. Such monitors include cathode ray tube (CRT) displays, as well as flat panel displays such as liquid crystal displays (LCD's), and in one embodiment is a super-VGA CRT display. Each pointing device 14 permits the control of the screen pointer provided by the graphic user interface of operating systems such as versions of Microsoft Windows. The invention is not limited to any particular type of pointing device 14. Such pointing devices include mouses, touch pads, trackballs, remotes, and point sticks. Keyboard 16 permits textual entry into computer 10 as another input device to the computer, and typically includes a plurality of alphanumeric keys, function keys, navigation keys, cursor keys, and numeric keypad keys. However, the invention is not so particularly limited.

Computer 10 of computer system 7 has running thereon communications software having chat room capability. The operation and construction of such communications software are known within the art. For example, online service providers such as America Online and Prodigy provide such communications software to their customers. For further example, such communications software such as Netscape Navigator and Internet Explorer permit such computers 10 to communicate with servers over the Internet, such that if the servers are themselves running appropriate software, the computers 10 are provided chat room capability. The chat room aspect of the software typically permits a number of users to chat with each other at the same time by typing in text for everyone else within the same room to see. The computer screen for such software is therefore divided into a section permitting text entry, a section in which the text entered by all the participants is viewable, and a section in which the names of the users within the room are shown.

Computer 10 of computer system 7 is operatively coupled to a tuner, which as shown in FIG. 1 is in one embodiment part of a television 18. The tuner is itself coupled to a source of programming that has a plurality of channels (e.g., channels corresponding to the television stations NBC, ABC, CBS, FOX, ESPN, MTV, etc.). For example, in the case of a tuner within television 18, such sources include cable television, an antenna for local broadcast reception, a digital broadcast satellite (DBS) system, and a C-Band satellite system. The invention is not so particularly limited, however. Computer 10 is coupled to the tuner such that it is able to determine the channel to which the tuner has been switched by a user. Such detection is known within the art.

Computer 10 of computer system 7 also includes an internal clock set to the local date and time in which the computer 10 is operating, as well as an electronic program guide (EPG). An electronic program guide is a database of guide information containing information related to the television programs viewable on the channels of the tuner (such as that within television 18, as obtaining the channels from a source such as cable television, etc.). Such electronic program guides are known within the art, and typically provided by a program guide provider. For example, Harman Interactive Group, manufactures and sells an EPG product that enables a computer user to receive weekly cable television program listing customized for a particular cable company direct to the user's computer. The program in this example is received over a direct-dial server. The invention is not so limited, however. Electronic program guides are also amenable to direct download, via satellite, or over the Internet from a different provider. Furthermore, such guides are amenable to transmission in-band or out-of-band with the television signals from a source such as cable or satellite television, as known within the art. The transmission within the vertical blanking interval (VBI) is particularly known within the art. The invention is not so limited, however.

Computer 10 of computer system 7 is therefore able to determine the program currently on the channel to which its corresponding tuner is switched by looking up the current date and time against the channel in the electronic program guide. For example, looking up 8 p.m. Central Standard Time for a date corresponding to a Thursday against a channel corresponding to an NBC affiliate may reveal that the program Friends is currently on the channel. In addition, each electronic program guide includes a unique identification code for each program. Therefore, computer 10 is also able to determine the unique identification code for the program currently on the channel.

Computer 10 of computer system 7 sends this information to central server 20. The manner by which computer 10 sends this information to central server 20 is not particularly limited in the invention. For example, in one embodiment, computer 10 includes a modem, and the modem communicatively connects with a modem of server 20 over standard POTS communications lines, or other communications lines, such as ISDN communications lines. In another embodiment, computer 10 is communicatively coupled to the Internet via a dial-up connection or a direct connection. Server 20 in this embodiment is an Internet host, such that computer 10 is able to communicate with server 20 over the Internet.

Server 20 is a computer similar to that of computer 10, except that preferably server 20 has much more memory and storage, and a much faster microprocessor, or having multiple microprocessors. Server 20 may be a workstation or a mini- or mainframe computer, as well. Server 20 has running thereon chat room server software that permits a number of computers 10 to engage in a chat session. Such communications software is the corresponding server software to that running on client computers 10, and the operation and construction of such software is known within the art. For example, online service providers such as America Online and Prodigy utilize such software to permit their customers to engage in chat room sessions. For further example, Internet chat rooms such as The Globe, at http://www.theglobe.com, are also known within the art.

Server 20 also has a database mapping each unique identification code with the program with which it corresponds. When server 20 receives identification code information from computer 10, it is therefore able to determine which program is on the channel switched to on a corresponding tuner of computer 10. Server 20 then links computer 10 to a chat room specific to that program. That is, the computer user of computer 10 is able to chat with other computer users who have their tuners switched to channels showing the same program. When a computer user switches the corresponding tuner to a different station, server 20 links computer 10 to a different chat room, specific to the newly tuned-in program.

Note, however, that the invention is not so limited. That is, there is not necessarily a causality between switching the corresponding tuner to a different station, and the computer linking to a chat room specific to the newly tuned-in program. For example, if the newly tuned-in program is a particular television sitcom, the linked chat room may not be the chat room for this sitcom sponsored by the network, but rather a "parody" chat room in which users type sarcastic comments regarding the program, but to which the chat room is not specific.

An example is illustrative to understanding the operation of the system of FIG. 1. Computer 10 may be running communications software such as that provided by online service providers such as America Online. In such case, computer 10 establishes a direct modem-to-modem connection with server 20 utilizing the software, and accesses a chat room feature found in such software. According to this embodiment of the invention, computer 10 sends to server 20 the identification code for the program currently on the channel switched to on the tuner of television 18. Server 20 then links computer 10 with a chat room specific to that program. That is, the client communications software of computer 10 receives information from the corresponding server communications software of server 20 for a chat room specific to the program on the currently switched to channel.

Furthermore, when the user changes the channel on the tuner of television 18, computer 10 sends to server 20 the identification code for the program on the new channel, and server 20 links computer 10 with a chat room specific to the new program. That is, the client communication software of computer 10 receives information from a corresponding server communications software of server 20 for a new chat room, specific to the new program on the currently switched to channel. Note that the computer user does not have to do anything to initiate this change in chat rooms. The user only changes the channel on the tuner; the computer then detects this change, and the server in response to information regarding which automatically changes the linked-to chat room.

As has been described in conjunction with and shown in FIG. 1, the tuner coupled to computer 10 of computer system 7 is a part of a television 18. This is only one embodiment, however, and the invention itself is not so limited. For example, the tuner may also reside on a hardware card for plugging into a corresponding internal or external slot or connection of computer 10, in which case the television picture may be viewable within a window of the computer screen of monitor 12. Such tuner cards are manufactured by and available from STB Video Rage, Inc.

Computer systems 5 and 9 represent other embodiments of computer systems amenable to the invention. Computer system 5 includes a computer 11, a wireless pointing device 23, and a wireless keyboard 24 substantially as has been described in conjunction with computer system 7. However, computer system 5 does not include a computer monitor. Rather, the computer 11 of system 5 displays information on television monitor 25. For example, computer 11 of system 5 has an integrated tuner card already installed. Such computers include the Destination Big Screen PC/TV, available from Gateway 2000, Inc., of North Sioux City, S.Dak., which includes Harman Interactive SmartTV software. This software permits a computer user to watch television either full-screen or in a re-sizeable window that can be moved around the desktop, and includes optional access to an online electronic programming guide.

As another example, system 9 includes a television set 18 and a set-top box 22 operable in a computerized chat system. The computer of system 9 is integrated into set-top box 22 (i.e., the functionality of computer 10 as has been described in conjunction with and system 7), which permits convenient location of the computer near television 18. The construction and operation of such set-top boxes, where the tuner is within the box, are known within the art. System 9 also includes a pointing device 14 and a keyboard 16 connected to the set-top box, as both have been described in conjunction with and system 7.

Figure 2:
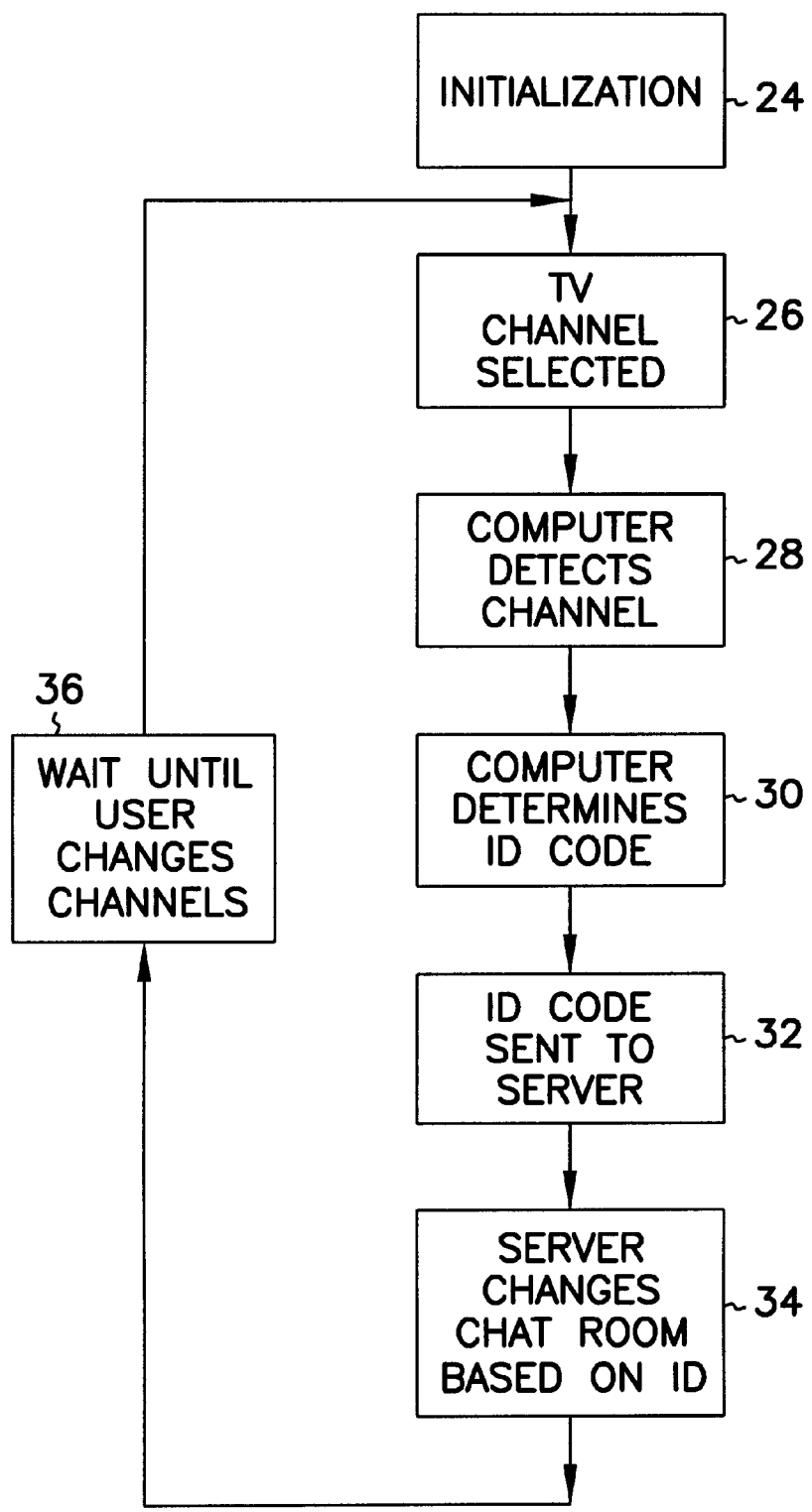
FIG. 2 is a flowchart of a method according to an embodiment of the invention; and, FIG. 3 is a diagram of a representative computer screen shot according to an embodiment of the invention.

Referring now to FIG. 2, a flowchart of a method according to an embodiment of the invention is shown. The method is described in conjunction with the preferred embodiment of the invention shown in FIG. 1; however, the method is not so limited, and, is applicable to other configurations of the invention as well. In step 24, the client computer (e.g., a computer 10 of FIG. 1) is initialized. This includes having the computer log onto the server computer, via appropriate communications software having chat room capability as has been described (e.g., over the Internet, and/or through a modem). The name of the user of the client computer is also preferably sent to the server in this initialization step. The client computer includes an electronic program guide, or information downloaded from the Internet or directly from a server, which includes an identification code for each program of each channel of a corresponding tuner (e.g., a tuner that is a part of a television 18 of FIG. 1).

In step 26, a channel on a tuner corresponding to the client computer is selected. As has been described, this channel may be a television channel such as NBC, ABC, ESPN, etc. However, the invention is not so limited. The computer detects the channel in step 28, as known within the art. In step 30, the computer determines the identification code for the program currently on the channel by referencing the code along with the current time and day in which the computer is operating, against the electronic program guide. This identification code is then sent to the central server (e.g., server 20 of FIG. 1) in step 32. The server changes the chat room linked to the computer in step 34, based on the identification sent in step 32. That is, the computer is linked to a chat room specific to the program having the identification code sent in step 32. The user is then able to chat with other users logged into the same server and having their tuners tuned to channels showing the same programs (i.e., even if tuned to different channels).

When the user changes the channel in step 36 (or another channel change event or interrupt occurs), the process is repeated at step 26. In a preferred embodiment, the method waits to ensure that the user has changed to a particular channel for at least a predetermined amount of time (e.g., ten seconds) at step 36 before proceeding back to step 26. This ensures that when a user is "channel surfing"—that is, repeatedly changing channels without staying at any one particular channel for a relatively long period of time—the server is not overloaded by identification codes sent by the computer. For example, the user of the computer may easily be able to change the channel ten or fifteen times in a minute. However, it may take the server upwards of thirty seconds to link the computer to a new chat room, considering the delays involved in the computer detecting the new channel, the computer sending the new identification code, the server receiving the new identification code, etc.

Figure 3:
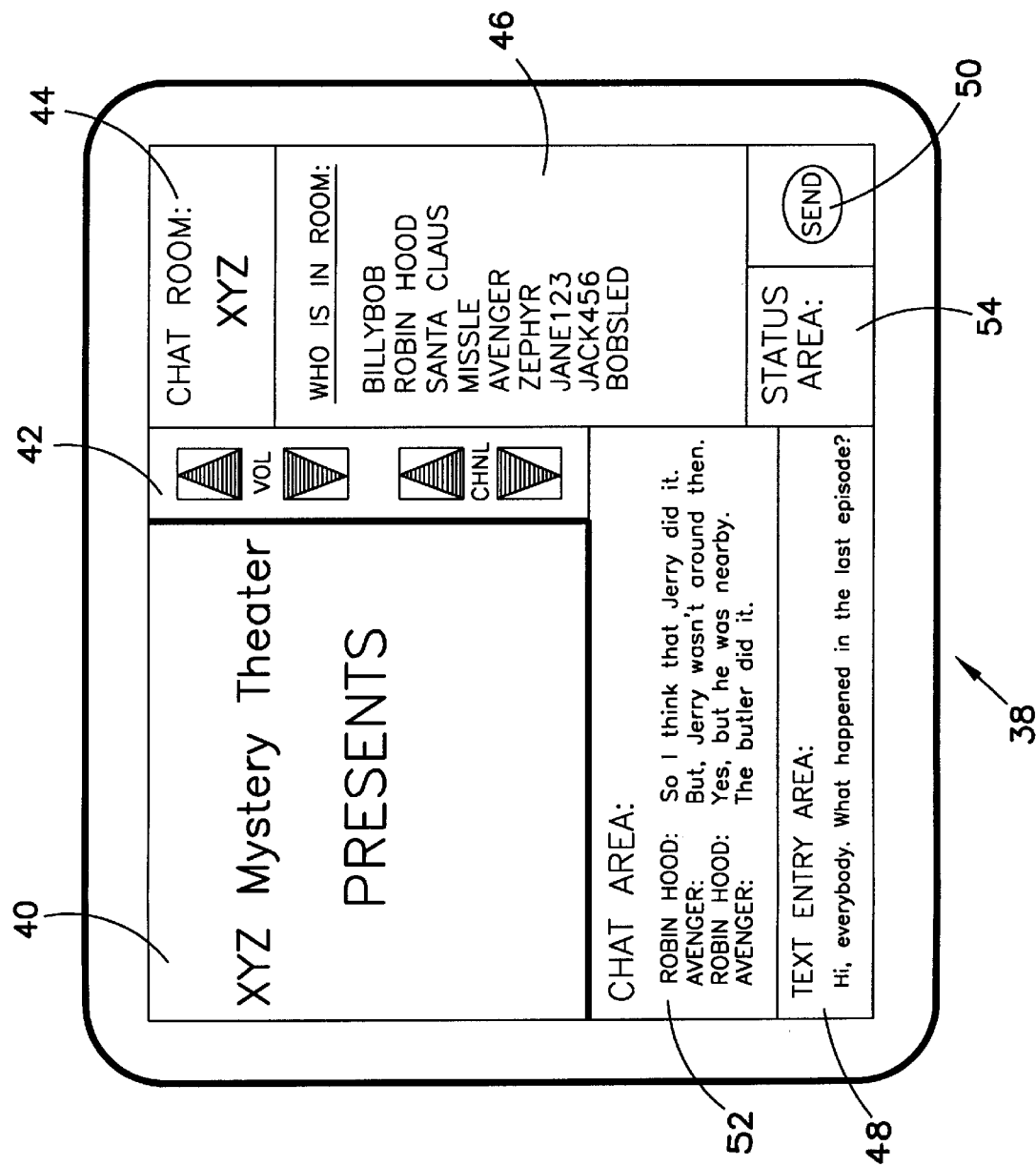

Referring now to FIG. 3, a diagram of a representative computer screen shot according to an embodiment of the invention is shown. Such a computer screen shot is from communications software having chat room capability running on a client computer having an integrated tuner card, so that the television program is viewable as a window on the display screen of the monitor coupled to the computer. The invention is not particularly limited to the representative screen shot of FIG. 3, however. Display screen 38 includes television program area 40, in which the actual television program is viewable. This television program is obtained directly from the integrated tuner card, which is itself coupled to a source such as cable or satellite television. Television controls area 42 provides on-screen buttons to control the volume and the selected channel. Chat room identification area 44 indicates the name of the chat room; that is, it indicates the television program to which the chat room is specific. This information is maintained by the server, which sends the information to the client computer.

Participants area 46 lists the names of the computer users who are participating in the computer chat room. These names are obtained by the server computer preferably when the client computers first log onto the server computer. The server computer also maintains this list of names, and sends it to the client computers as necessary, that is, when a new user has entered the room, or a user has left the chat room. A computer user typing text for viewing by others within the chat room is able to see the entered text in text entry area 48. The text is preferably not transmitted to the server until the user has pressed enter, or has clicked on-screen send button 50. Once the text has been transmitted, the server sends the information to all the client computers, along with the name of the originating user of the information. This information is then displayed in chat area 52. Any other status information is displayed in status display area 54.

Therefore, a computer user selecting a television program using controls within controls area 42 is able to view the program on television program area 40. Once the user has so selected a channel, the identification code for the program currently on that channel is sent to the server. The server receives this information, and transmits to the computer the name of the chat room for display in chat room identification area 44. The server also sends information regarding other users already in the room for display in participants area 46. The user is able to view what other users are typing in chat area 52, as that information is sent by the server to the user's computer. Because all the users within the chat room are watching the same program, typically the users will be chatting about the program. The user is able to type in his or her own comments in text entry area 48, which are sent to the server upon selection of on-screen button 50, and then transmitted to all the users' computers (including the author of the comments).

When the user changes the channel via controls area 42, a new television program is viewed in area 40, and the server immediately sends new information for display in areas 44 and 46. If a user does not change the channel, the information in areas 46 and 52 are updated as necessary by the server, and sent to the computer for display. That is, as new comments are entered into various users' text entry areas 48, these comments are viewed on other users' chat areas 52; as the users participating in the chat room change, so does participants area 46.

The automatic linking to program-specific computer chat rooms has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A computerized chat system comprising:
    a central chat server maintaining a plurality of program-specific chat rooms;
    at least one tuner, each tuner capable of switching among a plurality of channels, each channel receptive to a plurality of programs;
    at least one computer, each computer having a program guide including an identification code for each program of each channel of a corresponding tuner,
    wherein each computer detects the channel switched to on the corresponding tuner and sends the code of the program currently on the channel to the Server, the server linking the computer to the chat room for the program corresponding to the code, automatically without any user intervention.

2. The computerized chat system of claim 1, wherein each channel is a television channel, and each program is a television program.

3. The computerized chat system of claim 1, wherein each tuner is selected from the group of tuners consisting of: a cable television tuner, a broadcast over-the-air television tuner, and a satellite television tuner.

4. The computerized chat system of claim 1, wherein the computer includes an Internet connection and receives the program guide from a program guide provider over the Internet.

5. The computerized chat system of claim 1, wherein the computer includes a modem and sends the code of the program currently on the channel switched to on the corresponding tuner to the server via the modem of the computer communicatively coupling to a corresponding modem of the server.

6. The computerized chat system of claim 1, wherein the computer includes an Internet connection and sends the code of the program currently on the channel switched to on the corresponding tuner to the server over the Internet.

7. The computerized chat system of claim 1, wherein the corresponding tuner for each computer is integrated into the computer.

8. The computerized chat system of claim 1, wherein each tuner is disposed within a display device having a screen upon which the program currently on the channel switched to on the tuner is viewable.

9. The computerized chat system of claim 1, wherein each computer and the corresponding tuner is disposed within a housing.

10. A computer for a computerized chat system comprising:
    a memory storing a program guide including an identification code for each of a plurality of programs of each of a plurality of channels of a corresponding tuner,
    means for detecting a channel to which the corresponding tuner is switched;
    means for obtaining the identification code; and,
    means for sending the identification code of the program currently on the channel switched to on the corresponding tuner to a chat server, automatically without any user intervention.

11. The computer of claim 10, wherein each channel is a television channel, and each program is a television program.

12. The computer of claim 10, further comprising a modem through which the computer sends the identification code of the program currently on the channel switched to on the corresponding tuner to the chat server.

13. The computer of claim 10, further comprising an Internet connection, the computer sending the identification code of the program currently on the channel switched to on the corresponding tuner to the chat server over the Internet.

14. The computer of claim 10, wherein the corresponding tuner is integrated into the computer.

15. The computer of claim 10, further comprising a housing for containing the computer and the corresponding tuner.

16. A computer-readable medium having a computer program stored thereon for a suitably equipped computer, the program comprising:

means for detecting a channel switched to on a corresponding tuner; and, means for sending an identification code of a program currently on the channel switched to on the corresponding tuner to a server, wherein the server links the computer to chat room for the program corresponding to the identification code, automatically without any user intervention.

17. The computer-readable medium of claim 16, wherein each channel is a television channel, and each program is a television program.

* * * * *